United States Patent [19]
Shibata

[11] 3,796,278
[45] Mar. 12, 1974

[54] ELECTRIC CONTROL SYSTEM FOR DRIVING AN ELECTRIC VEHICLE

[75] Inventor: Fukuo Shibata, Nishinomiya, Japan

[73] Assignee: Kawasaki Jukogyo Kabushiki Kaisha, Hyogo, Japan

[22] Filed: Sept. 15, 1972

[21] Appl. No.: 289,383

[30] Foreign Application Priority Data
Sept. 15, 1971 Japan................................ 46-71542

[52] U.S. Cl. ................................................. 180/65
[51] Int. Cl. .............................................. B60k 1/00
[58] Field of Search......................... 180/65; 290/45

[56] References Cited
UNITED STATES PATENTS
3,628,621  12/1971  Lee ..................................... 180/65 R
3,716,767  2/1973  Kuriyama et al. ..................... 180/65

Primary Examiner—Stanley H. Tollberg
Attorney, Agent, or Firm—Sughrue, Rothwell, Mion, Zinn & Macpeak

[57] ABSTRACT

An electric motor for driving a wheel of a vehicle may be arranged to be supplied with electric power, through a chopper control system using controlled rectifiers, from an electric battery group connected in parallel with an electric generator driven by a driving machine such as a prime mover. The efficiency of the driving system can be increased and the temperature rise of the electric battery can be kept low by providing an inductor which permits discharging D.C. current to flow from the electric battery and prevents charging current of high frequency from flowing to the electric battery.

11 Claims, 5 Drawing Figures

PATENTED MAR 12 1974

ELECTRIC CONTROL SYSTEM FOR DRIVING AN ELECTRIC VEHICLE

BACKGROUND OF THE INVENTION

1. Field of the Invention

This invention is related to an electric control system for driving an electric vehicle whose wheel can be driven by an electric motor supplied with electric power from an electric battery group connected in parallel with an electric generator driven by a driving machine such as a prime mover.

2. Description of the Prior Art

In general, an electric motor for driving a wheel of an electric vehicle is supplied with electric power from an electric battery group. However, when an electric motor for driving a wheel of an electric vehicle is supplied with electric power from only an electric battery group, the distance over which the electric vehicle can run by one charged electric quantity of the battery is very short. In order to make the running distance of the electric vehicle longer, a hybrid power source for the electric vehicle was devised.

In some prior electric driving systems for the electric vehicle, a wheel is driven by an electric motor supplied with electric power from an electric battery group connected in parallel with an electric generator driven by a driving machine such as a prime mover. The following are examples of the prime movers used: (1) gasoline engine, (2) diesel engine (3) steam engine (4) sterling engine (5) rotary engine (6) gas turbine (7) steam turbine (8) air turbine (9) nitrogen turbine.

In many cases of the prior electric driving systems for the electric vehicles, direct current motors are used for driving the wheels of the vehicles. When a direct current motor driving a wheel of an electric vehicle is supplied with electric power from a direct current source such as an electric battery group connected electrically in parallel with an electric generator driven by a prime mover, a chopper system using controlled rectifiers such as thyristors, power transistors, etc., is very useful for controlling the electric motors over a wide speed range without sacrificing the efficiency of system in general. However, there is a technical problem in a chopper system using controlled rectifiers when an electric motor is supplied with electric power from an electric source of a parallel connection of an electric battery group and an electric generator driven by a prime mover.

When the electric motor driving the load is controlled by a chopper which is connected electrically in the motor circuit, voltage rise and fall of high frequencies are produced in the electric circuit of the chopper. The peak voltage rise occurs in the chopper circuit during the instant when the electric motor circuit is interrupted by the operation of a chopper which controls the supplied average voltage of the electric motor. The electric battery group is charged from the electric generator driven by the prime mover during the instant when the peak voltage rise is produced. The electric power which instantaneously charges the electric battery from the electric generator driven by the prime mover is discharged in the subsequent instant, to supply the electric motor. When an electric battery is unnecessarily charged from an electric source, a charging loss is produced in the electric battery group. When an electric battery is discharged for supplying a load, a discharging loss is produced in the electric battery. Therefore, if the electric battery is charged and discharged, the charging and discharging losses are produced in the electric battery, and then the efficiency of the electric control system becomes low. In other words, the efficiency of transmitting electrical power from the generator to the motor through the battery becomes considerably lower than the efficiency of transmitting an electrical power directly from the generator to the motor. Further, an unnecessary temperature rise of the electric battery occurs when electric power is transmitted from the generator to the motor through the process of charging and discharging of the battery.

SUMMARY OF THE INVENTION

It is the primary object of the invention to provide an electric control system for driving an electric vehicle in which an electric motor driving a wheel of the electric vehicle is supplied with electric power from an electric source of a parallel connection of an electric battery group and an electric generator driven by a driving machine such as a prime mover without sacrificing efficiency of operation of the system by preventing the unnecessary charging and discharging of the battery.

Another object of this invention is to provide an electric control system for driving an electric vehicle in which an electric motor driving a wheel of the electric vehicle is supplied with electric power from combined electric sources of an electric battery group and an electric generator driven by a driving machine such as a prime mover without producing unnecessary temperature rise in the electric battery group.

A further object of this invention is to reduce considerably the space of installation of an electric control system for driving an electric vehicle and the weight of the electric battery group installed in an electric vehicle.

Other objects of this invention will in part be obvious and in part appear hereinafter.

DESCRIPTION OF THE PREFERRED EMBODIMENTS

Figure 1:
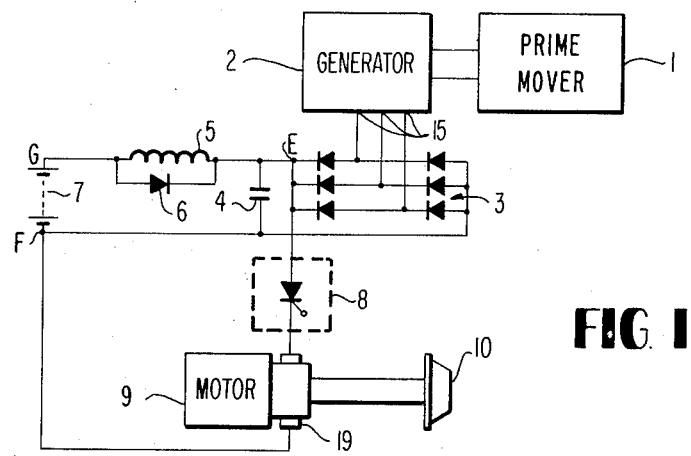
FIG. 1, FIG. 2, FIG. 3 and FIG. 5 illustrate diagrammatically systems of this invention.

As shown in FIG. 1, an electric control system for driving an electric vehicle of this invention includes a wheel 10 by which the vehicle can be driven forward. An electric generator 2 which has output terminals 15 is driven by a prime mover 1. An electric motor 9 which has input terminals 19 and has a rotor is arranged to drive the wheel 10 of the vehicle, and an electric battery group 7 has output terminals F, G connected electrically with the input terminals 19 of the electric motor 9 and with the output terminals 15 of the electric generator 2. A rectifier 6 is connected so that only discharging current of the electric battery 7 flows therethrough. Connected in parallel with rectifier 6 is an inductor 5 which passes D.C. and low frequency charging current and also passes the D.C. battery discharge current, but blocks high frequency charging currents.

The following machines are shown as examples of a prime mover: (1) gasoline engine (2) diesel engine (3)

steam engine (4) sterling engine (5) rotary engine (6) gas turbine (7) steam turbine (8) air turbine (9) nitrogen turbine.

In FIG. 1, a chopper 8 comprising controlled rectifiers is connected electrically with the electric motor 9 which is a direct current motor. The voltage supplied on the input terminals 19 of the direct current motor 9 from the electric source can be controlled by controlling the chopper 8. The electric source is composed of an electric generator 2 of which the output terminals 15 are connected electrically with the output terminals F, G of the electric battery group 7. In FIG. 1, the electric generator is an alternating current generator 2 of which the output terminals 15 are connected electrically with the output terminals F, G of the electric battery group 7 through a converter 3 composed of rectifiers. An inductor 5 is connected electrically in parallel with the rectifier 6 in the electric circuit which is connected between the output terminals 15 of the electric generator 2 and the output terminal G of the electric battery group 7. A condenser 4 is connected electrically with the output terminals 15 of the electric generator 2 so that the condenser 4 may be supplied with electric power from the electric generator 2 or from the electric motor 9. When a voltage rise of high frequency is produces in the electric circuit of the chopper 8, the inductor 5 prevents the current due to the peak voltage of high frequency from flowing into the electric battery group 7, and the condenser 4 absorbs this current. Only D.C. or low frequency charging current and D.C. discharging current can flow through the inductor 5. The rectifier 6 permits only the D.C. discharging current of the electric battery 7 to flow therethrough.

Figure 2:
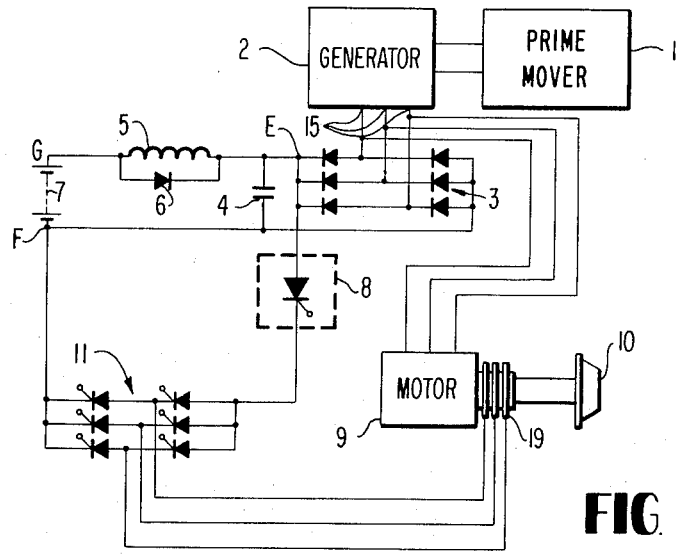

In FIG. 2, the electric motor for driving the wheel of the vehicle is a wound rotor type induction motor 9 which has a primary winding and a secondary winding and of which the primary winding is supplied with alternating current from the alternating current generator 2. The secondary winding is supplied with alternating current from the direct current source of the electric battery group 7 connected in parallel with the converter 3 of the electric generator 2 through the chopper 8 and an inverter 11 which is composed of controlled rectifiers.

Figure 3:
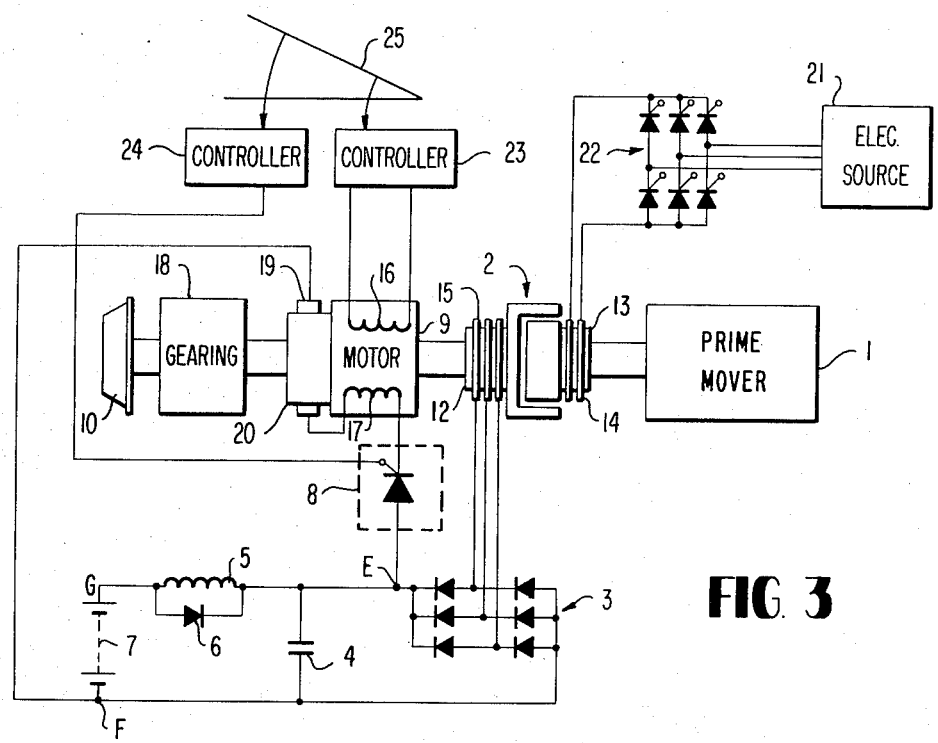

In FIG. 3, the electric generator is composed of an electro-magnetic coupling 2 having two rotors 12, 13 which are rotatable with respect to each other and one of which is provided with an armature winding. Rotor 12 of the electromagnetic coupling 2 is mechanically combined with the rotor of the electric motor 9 and the other rotor 13 of the electromagnetic coupling 2 is driven by the prime mover 1. In FIG. 3, the direct current motor 9 is provided with a voltage field winding 16 (shunt or separately excited field winding) and a current field winding 17 (series field winding). 20 is the commutator. The current of the direct current motor 9 is supplied from terminals E, F of the electric source. In FIG. 3, the wheel 10 of the vehicle is driven by the rotor shaft of the direct current motor 9 combined mechanically with the rotor 12 of the electromagnetic coupling 2 through a gearing 18 which may be a transmission. The wheel 10 can be controlled by both or either controlling a controller 23 of the voltage field winding 16 and/or a controller 24 of the chopper 8. These controllers 23 and 24 can be controlled by a pedal 25. Rotor 13 of the electromagnetic coupling 2 is provided with a field winding which can be supplied with exciting current from an electric source 21 through controlled rectifiers 22 and slip-rings 14. Rotor 12 of the electromagnetic coupling 2 is provided with an armature winding which is connected electrically with the converter 3 composed of rectifiers through slip-rings 15.

Figure 4:
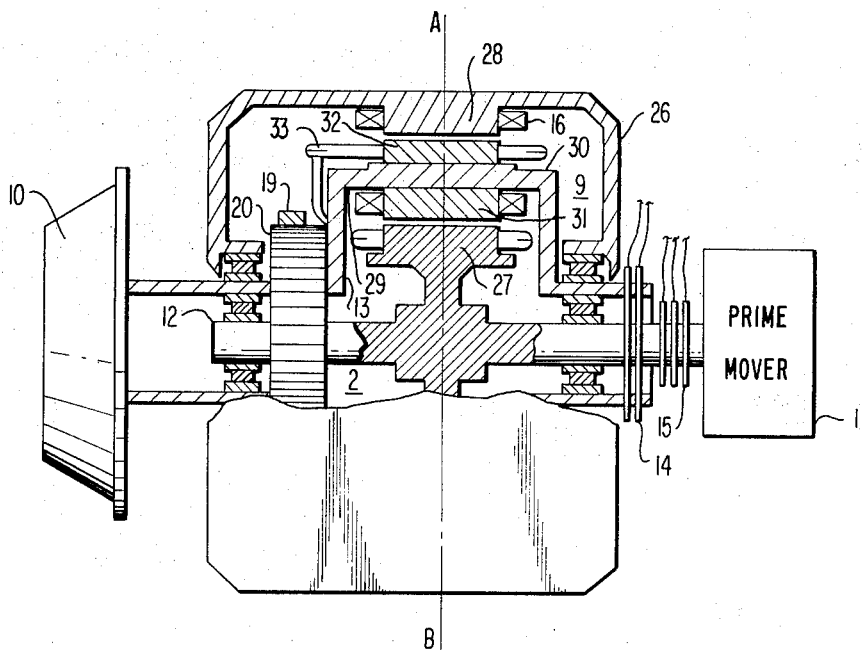
FIG. 4 illustrates a portion of the embodiment shown in FIG. 3.

FIG. 4 illustrates a part of the embodiment of construction of the arrangement shown in FIG. 3. FIG. 4 shows that one, 12, of the rotors 12 and 13 of the electromagnetic coupling 2 is adapted to drive the wheel 10, and the other rotor, 13, of the electromagnetic coupling 2 is adapted to be driven by prime mover 1. The one rotor 13 has a circumferential inner cylindrical part 29 provided with a magnetic member 31 for forming a magnetic circuit for the electromagnetic coupling 2 and a circumferential outer cylindrical part 30 which is provided with a magnetic member 32 forming a magnetic circuit for the electric motor 9 and the rotor 13. The rotor of the electric motor comprises a common rotor which rotates in a space between the stator 26 of the electric motor 9 and the other rotor 12 of the electromagnetic coupling 2. In FIG. 4, the electric motor 9 is a direct current motor.

FIG. 4 shows also that the magnetic member 27 forming a magnetic circuit in the inner rotor 12 of the electromagnetic coupling 2 and the magnetic member 28 forming a magnetic circuit in the stator 26 of the electric motor 9 exist together in a section AB perpendicular to a shaft of the inner rotor 12 of the electromagnetic coupling 2. In FIG. 4, the armature winding 33 of the elctric motor is connected electrically with the commutators 20.

Figure 5:
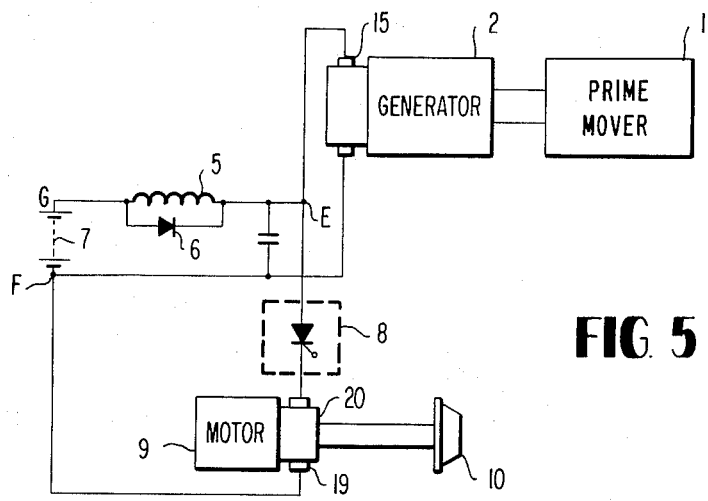

In FIG. 5, the electric generator 2 is a direct current generator of which the output terminals 15 are connected electrically with the output terminals G, F of the electric battery group 7 through the rectifier 6 connected electrically in parallel with the inductor 5.

When the electric motor 9 driving the wheel is controlled by the chopper 8, voltage rises of high frequencies are produced in the electric circuit E, F of the chopper. Electric energy produced by these voltage rises is absorbed in the condenser 4, and cannot pass through the inductor 5. Since the rectifier 6 blocks the charging current of the battery 7, the electric battery 7 is not supplied with electric power produced by the voltage rises of high frequencies at the chopper 8. Only direct current electric power or low frequency electric power can pass through the inductor 5. The electric battery group 7 can be charged by a direct current electric power through the inductor 5 from the electric generator, and can be discharged through the rectifier 6.

Electric energy absorbed in the condenser 4 can be used to supply the electric motor 9. Therefore, the electric battery group 7 can be prevented from unnecessary charge and discharge. Thus, unnecessary temperature rise of the electric battery group does not occur.

As the electric battery group can be used efficiently, the weight of the electric battery group necessary to install in an electric vehicle can be reduced considerably.

In FIG. 2, the inverter 11 is used as a separately excited inverter. The wound rotor type inductor motor 9 is controlled in a speed range of slip $S>1$.

In FIG. 3, a part of the output of the prime mover 1 can be transmitted to the load directly or mechanically through the electromagnetic coupling 2. the other part of the output of the prime mover 1 can be converted into electric energy through the electromagnetic coupling.

While the invention has been particularly shown and described with reference to the preferred embodiments thereof, it will be understood by those skilled in the art that various changes in form and details may be made therein without departing from the spirit and scope of the invention.

I claim:

1. An electric control system for driving an electric vehicle comprising:
   a. wheel means for driving the vehicle;
   b. electric generator means having output terminals;
   c. a prime mover arranged to drive said electric generator means;
   d. electric motor means including input terminals and a rotor arranged to drive said wheel;
   e. an electric battery group having output terminals connected to said input terminals of the electric motor means and to said output terminals of the electric generator means; and
   f. inductor means connected electrically, in the closed D.C. circuit including said electric battery group and said electric motor means, in series with one of said output terminals of the electric generator means and one of said output terminals of the electric battery group for permitting D.C. discharge current to flow from the electric battery group to said input terminals of the electric motor means and for preventing high frequency charging current from flowing to the electric battery group.

2. An electric control system for driving an electric vehicle as set forth in claim 1, further including a chopper means comprising controlled rectifiers connected to the electric motor means, for controlling the current supplied to said motor means.

3. An electric control system for driving an electric vehicle as set forth in claim 1, further including rectifier means connected electrically in parallel with said inductor means for providing a d. c. discharge path for the electric battery group.

4. An electric control system for driving an electric vehicle as set forth in claim 1, further including a condenser connected electrically with the output terminals of the electric generator means wherein the condenser may be supplied with electric power from the electric generator means.

5. An electric control system for driving an electric vehicle as set forth in claim 1, wherein the electric generator means is an alternating current generator having output terminals connected to the output terminals of the electric battery group through converter means comprising rectifiers.

6. An electric control system for driving an electric vehicle as set forth in claim 1, wherein the electric generator means is a direct current generator having output terminals connected to the output terminals of the electric battery group.

7. An electric control system for driving an electric vehicle as set forth in claim 1, wherein the electric generator means includes an electromagnetic coupling having two rotors, rotatable with respect to each other, wherein one of the rotors is provided with an armature winding, and wherein one of the rotors is mechanically combined with the rotor of the electromagnetic coupling driven by said prime mover.

8. An electric control system for driving an electric vehicle as set forth in claim 1, wherein the electric generator means comprises an electromagnetic coupling having two rotors which are rotatable with respect to each other wherein one of the rotors is provided with an armature winding and wherein one of the rotors is adapted to drive the wheel, and the other of the rotors is adapted to be driven by said prime mover, the one rotor having a circumferential inner cylindrical part including a magnetic member forming a magnetic circuit for the electromagnetic coupling and a circumferential outer cylindrical part including a magnetic member forming a magnetic circuit for the electric motor means and the one rotor and the rotor of the electric motor means comprising a common rotor which rotates in a space between the stator of the electric motor means and the other rotor of the electromagnetic coupling.

9. An electric control system for driving an electric vehicle as set forth in claim 8, wherein the electric motor means is a direct current motor.

10. An electric control system for driving an electric vehicle as set forth in claim 1, wherein the electric motor means is a direct current motor.

11. An electric control system for driving an electric vehicle as set forth in claim 1, wherein the electric motor means is a wound rotor type induction motor wherein the input terminals of the induction motor are supplied with electric power from the electric battery group.

* * * * *